US010933535B2

(12) United States Patent
Jiang et al.

(10) Patent No.: US 10,933,535 B2
(45) Date of Patent: Mar. 2, 2021

(54) ROBOT AND GRIPPER WITH SYNTHETIC FIBRILLAR ADHESIVE

(71) Applicant: Flexiv Ltd., Santa Clara, CA (US)

(72) Inventors: Hao Jiang, Santa Clara, CA (US); Shiquan Wang, Foster City, CA (US)

(73) Assignee: Flexiv Ltd., Grand Cayman (KY)

( * ) Notice: Subject to any disclaimer, the term of this patent is extended or adjusted under 35 U.S.C. 154(b) by 0 days.

(21) Appl. No.: 16/545,246

(22) Filed: Aug. 20, 2019

(65) Prior Publication Data
US 2020/0061844 A1 Feb. 27, 2020

Related U.S. Application Data

(60) Provisional application No. 62/721,352, filed on Aug. 22, 2018.

(51) Int. Cl.
*B25J 15/00* (2006.01)

(52) U.S. Cl.
CPC ......... *B25J 15/008* (2013.01); *B25J 15/0028* (2013.01)

(58) Field of Classification Search
CPC .............................. B25J 15/008; B25J 15/0028
USPC ........................................ 294/86.4, 215, 902
See application file for complete search history.

(56) References Cited

U.S. PATENT DOCUMENTS

| 3,370,879 A * | 2/1968 | Green | A01D 46/26 |
| | | | 294/86.4 |
| 3,675,962 A * | 7/1972 | Simpson | B66C 1/46 |
| | | | 294/99.1 |
| 4,132,318 A * | 1/1979 | Wang | B25J 13/082 |
| | | | 294/86.4 |
| 4,456,293 A * | 6/1984 | Panissidi | B25J 13/082 |
| | | | 294/106 |
| 4,667,997 A * | 5/1987 | Udagawa | B25J 13/082 |
| | | | 294/86.4 |
| 4,858,979 A * | 8/1989 | Parma | B25J 15/0052 |
| | | | 294/106 |
| 5,871,248 A | 2/1999 | Okogbaa et al. | |
| 7,445,260 B2 * | 11/2008 | Nihei | B25J 9/1612 |
| | | | 294/106 |

(Continued)

FOREIGN PATENT DOCUMENTS

| CN | 107309890 | 11/2017 |
| WO | 2015179501 | 11/2015 |

(Continued)

OTHER PUBLICATIONS

International Search Report for International Application No. PCT/CN2019/101859, dated Nov. 21, 2019, (7 pages).

*Primary Examiner* — Paul T Chin
(74) *Attorney, Agent, or Firm* — K&L Gates LLP

(57) ABSTRACT

A gripper and a robot are provided. The gripper may include a shell and at least two finger assemblies. The finger assemblies are utilized to grasp an object on two opposite sides of the object. Each finger assembly may include a connecting rod, a pad portion and a layer of synthetic fibrillar adhesive. The connecting rod may be movably connected to the shell. The pad portion may be connected to the connecting rod, and the connecting rod may move the pad portion towards the object under a driving force. The layer of synthetic fibrillar adhesive may be attached to the pad portion. Microfibers of the layer of synthetic fibrillar adhesive may be inclined away from the shell.

11 Claims, 5 Drawing Sheets

(56) References Cited

U.S. PATENT DOCUMENTS

| | | | |
|---|---|---|---|
| 7,513,546 B2* | 4/2009 | Vranish | B25J 15/106 |
| | | | 269/266 |
| 10,647,004 B2* | 5/2020 | Hawkes | C09J 7/00 |
| 2010/0156127 A1 | 6/2010 | De Kervanoael | |
| 2014/0227473 A1* | 8/2014 | Parness | B25J 15/008 |
| | | | 428/64.1 |
| 2014/0272272 A1* | 9/2014 | Spenko | B29C 39/026 |
| | | | 428/113 |
| 2016/0200946 A1 | 7/2016 | Hawkes et al. | |
| 2018/0264657 A1* | 9/2018 | Dadkhah Tehrani | C09J 7/00 |
| 2020/0001472 A1* | 1/2020 | Jiang | B25J 13/085 |

FOREIGN PATENT DOCUMENTS

| | | | |
|---|---|---|---|
| WO | 2018009754 | | 1/2018 |
| WO | WO2018/009754 | * | 1/2018 |

* cited by examiner

ROBOT AND GRIPPER WITH SYNTHETIC FIBRILLAR ADHESIVE

CROSS-REFERENCE TO RELATED APPLICATIONS

The present application claims the benefit of priority under 35 U.S.C § 119(e) to U.S. Provisional Patent Application Ser. No. 62/721,352, entitled "SYNTHETIC FIBRILLAR ADHESIVE MECHANISM TO ENHANCE THE GRASPING ABILITY OF MULTI-FINGER GRIPPERS" and filed on Aug. 22, 2018, the disclosure of which is herein incorporated by reference in its entirety.

TECHNICAL FIELD

The present disclosure generally relates to grasping devices, and in particular to a robot and a gripper with synthetic fibrillar adhesive.

BACKGROUND

Robotic grippers are widely used in industrial automation and manufacturing, as well as services involving human-machine interactions and research laboratories. Many conventional multi-finger grippers rely heavily on pinching forces to generate adequate friction between the grippers and an object to grasp and lift the object. For small objects that can fit between the fingers, the conventional gripper's grasping ability depends largely on the gripper's actuation force, which determines the pinching force and thus the generated friction. The level of actuation force is a hard constraint for many grippers that may limit grippers from grasping and lifting certain objects.

For large objects that are beyond the pinching range of the gripper's fingers, especially those with large flat surfaces, the gripper cannot grasp nor lift the objects. Some solutions to lift such large objects are air suction and magnets (for ferromagnetic objects). These solutions, however, require a significant number of additional infrastructures and pneumatic actuation systems. It is also challenging to finely control the suction force when picking up fragile objects to prevent permanent damage.

SUMMARY

Accordingly, the present disclosure provides a robot and a gripper with synthetic fibrillar adhesive.

To solve the above-mentioned problem, a technical scheme adopted by the present disclosure is to provide a gripper. The gripper may include a shell and two finger assemblies. Each finger assembly is configured to grasp the object on two opposite sides of the object respectively. Each finger assembly may include a connecting rod, a pad portion and a layer of synthetic fibrillar adhesive. The connecting rod may be movably connected to the shell. The pad portion may be connected to the connecting rod, and the connecting rod may move the pad portion towards the object under a driving force. The layer of synthetic fibrillar adhesive may be attached to the pad portion. Microfibers of the layer of synthetic fibrillar adhesive may be inclined in an opposite direction of the manipulation direction of the gripper.

In another technical scheme, the gripper is configured to lift the object. When the gripper lifts the object, the layer of synthetic fibrillar adhesive may be activated by gravity such that a contact area and an adhesion force increase between microfibers of the layer of synthetic fibrillar adhesive and the object.

In another technical scheme, each of the two finger assemblies further include at least one loading component connected between the layer of synthetic fibrillar adhesive and the pad portion. The at least one loading component is configured to transmit shear force from the pad portion to the layer of synthetic fibrillar adhesive in a first direction. The first direction is from the shell toward the layer of synthetic fibrillar adhesive.

In another technical scheme, the at least one loading component is configured to transmit shear force from the pad portion to the layer of synthetic fibrillar adhesive in a second direction perpendicular to the first direction.

In another technical scheme, the at least one loading component is a loading film. The loading film includes a body portion, a first tendon, and a second tendon. The body portion is attached between the layer of synthetic fibrillary adhesive and the pad portion. The first tendon is connected between the body portion and a first side of the pad portion and is configured to transmit shear force from the pad portion to the layer of synthetic fibrillar adhesive in the first direction. The second tendon is connected between the body portion and a second side of the pad portion and is configured to transmit shear force from the pad portion to the layer of synthetic fibrillar adhesive in the second direction.

In another technical scheme, each of the two finger assemblies includes a compliant layer attached between the loading film and the pad portion.

In another technical scheme, an inclination direction of a portion of the microfibers of the layer of synthetic fibrillar adhesive is different from that of another portion of the microfibers.

To solve the above-mentioned problem, another technical scheme adopted by the present disclosure is to provide a gripper. The gripper may include a shell and two finger assemblies. Each finger assembly may include a connecting rod, a pad portion, and a layer of synthetic fibrillar adhesive. The connecting rod may be movably connected to the shell. The pad portion may be connected to the connecting rod, and the connecting rod may move the pad portion towards the object under a driving force. The layer of synthetic fibrillar adhesive may be attached to the pad portion. When the gripper lifts the object, the layer of synthetic fibrillar adhesive may be activated by gravity such that a contact area and an adhesion force increase between microfibers of the layer of synthetic fibrillar adhesive and the object.

In another technical scheme, each of the two finger assemblies includes at least one loading component connected between the layer of synthetic fibrillar adhesive and the pad portion. The at least one loading component is configured to transmit shear force from the pad portion to the layer of synthetic fibrillar adhesive in a first direction opposite to the direction of gravitational force.

In another technical scheme, the at least one loading component is configured to transmit shear force from the pad portion to the layer of synthetic fibrillar adhesive in a second direction perpendicular to the first direction.

In another technical scheme, the at least one loading component is a loading film. The loading film includes a body portion, a first tendon, and a second tendon. The body portion is attached between the layer of synthetic fibrillar adhesive and the pad portion. The first tendon is connected between the body portion and a first side of the pad portion and is configured to transmit shear force from the pad portion to the layer of synthetic fibrillar adhesive in the first direction. The second tendon is connected between the body portion and a second side of the pad portion and is configured to transmit shear force from the pad portion to the layer of synthetic fibrillar adhesive in the second direction.

In another technical scheme, each of the two finger assemblies includes a compliant layer attached between the layer of synthetic fibrillar adhesive and the pad portion.

In another technical scheme, an inclination direction of a portion of the microfibers of the layer of synthetic fibrillar adhesive is different from that of another portion of the microfibers.

To solve the above-mentioned problem, another technical scheme adopted by the present disclosure is to provide a robot having a gripper. The gripper may include a shell and two finger assemblies. Each finger assembly is configured to grasp the object on two opposite sides of the object respectively. Each finger assembly may include a connecting rod, a pad portion and a layer of synthetic fibrillar adhesive. The connecting rod may be movably connected to the shell. The pad portion may be connected to the connecting rod, and the connecting rod may move the pad portion towards the object under a driving force. The layer of synthetic fibrillar adhesive may be attached to the pad portion. Microfibers of the layer of synthetic fibrillar adhesive may be inclined away from the shell.

In another technical scheme, the gripper of the robot is configured to lift the object. When the gripper lifts the object, the layer of synthetic fibrillar adhesive may be activated by gravity such that a contact area and an adhesion force increase between microfibers of the layer of synthetic fibrillar adhesive and the object.

In another technical scheme, each of the two finger assemblies of the robot include at least one loading component connected between the layer of synthetic fibrillar adhesive and the pad portion. The at least one loading component may be configured to transmit shear force from the pad portion to the layer of synthetic fibrillar adhesive in a first direction. The first direction is from the shell toward the layer of synthetic fibrillar adhesive.

In another technical scheme, the at least one loading component of the robot is configured to transmit shear force from the pad portion to the layer of synthetic fibrillar adhesive in a second direction perpendicular to the first direction.

In another technical scheme, the at least one loading component of the robot is a loading film. The loading film includes a body portion, a first tendon, and a second tendon. The body portion is attached between the layer of synthetic fibrillar adhesive and the pad portion. The first tendon is connected between the body portion and a first side of the pad portion and is configured to transmit shear force from the pad portion to the layer of synthetic fibrillar adhesive in the first direction. The second tendon is connected between the body portion and a second side of the pad portion and is configured to transmit shear force from the pad portion to the layer of synthetic fibrillar adhesive in the second direction.

In another technical scheme, each of the two finger assemblies of the robot include a compliant layer attached between the loading film and the pad portion.

In another technical scheme, an inclination direction of a portion of the microfibers of the layer of synthetic fibrillar adhesive of the robot is different from that of another portion of the microfibers.

BRIEF DESCRIPTION OF THE DRAWINGS

To more clearly explain the technical solutions in the embodiments of the present disclosure, the drawings used in the description of the embodiments will be briefly described below. The drawings in the following description are merely exemplary embodiments of the present disclosure. For those of ordinary skill in the art, other drawings may also be obtained based on these drawings without any creative work.

DETAILED DESCRIPTION

The disclosure will now be described in detail with reference to the accompanying drawings and examples. As will be apparent to one skilled in the art, the embodiments described in the present disclosure are merely exemplary and represent only a subset of all such embodiments. In particular, all other embodiments obtained by a person of ordinary skill in the art based on the embodiments of the present invention without creative efforts fall within the scope of the present disclosure.

Figure 1A:
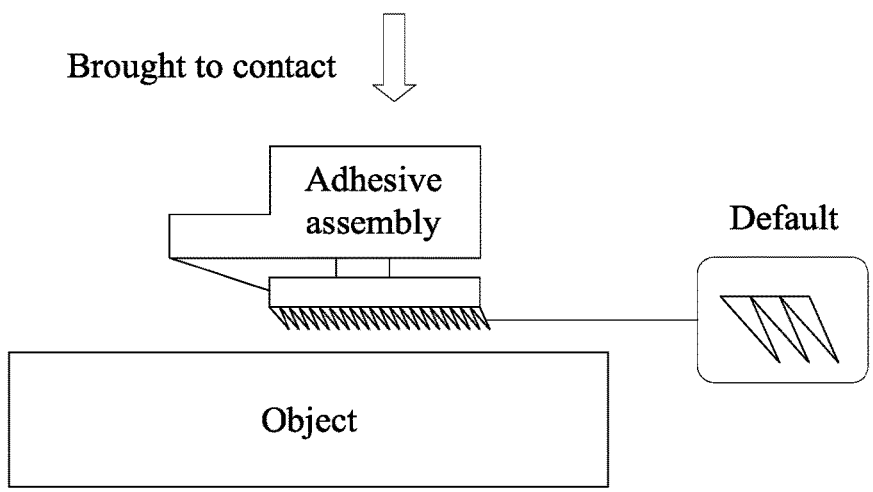
FIGS. 1A, 1B, and 1C show an exemplary attachment and detachment operation of a synthetic fibrillar adhesive assembly, according to an embodiment of the present disclosure.
Figure 1B:
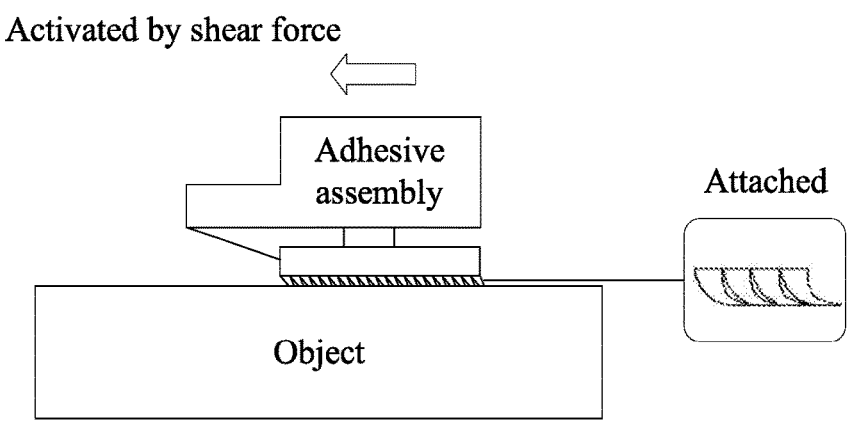
Figure 1C:
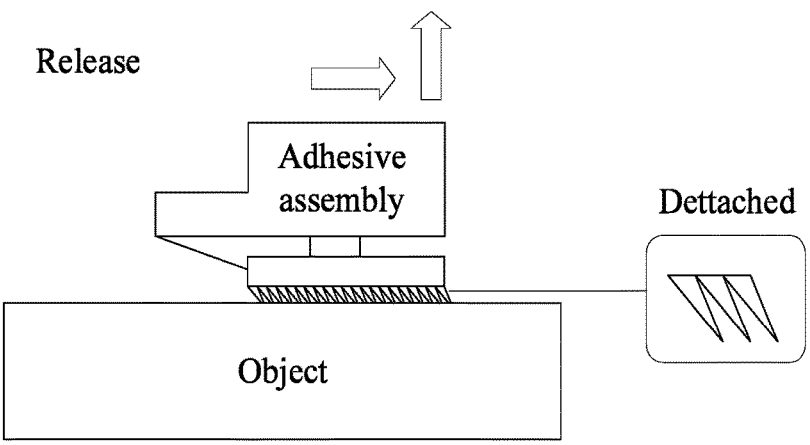

FIGS. 1A, 1B, and 1C depict an attachment and detachment operation of a synthetic fibrillar adhesive assembly. In certain embodiments, the adhesive assembly has pointed fibrillar microfibers such that the initial contact area with a surface of an object to be grasped is negligible (as shown in FIG. 1a) when the adhesive assembly is first brought into contact with the object. Thus, the adhesive does not adhere to the surface of the object when the adhesive assembly is first brought into contact with the object. As the fibrillar adhesives contact the surface of the object, however, the adhesive assembly may be activated by shear force when the adhesive assembly is moved in the direction shown in FIG. 1B. The motion of the adhesive assembly preloads the fibrillar adhesives inward in shear force. The preload forces may be transmitted to the fibrillar adhesive through the compliant springs and load tendons (not labeled) to enable an optimal loading angle and even stress distributions among the fibrillar adhesives.

In some examples, when the adhesive assembly moves as illustrated in FIG. 1B and described above, the adhesive fibers lay over and the contact area between the adhesive fibers and the surface of the object increases significantly. This adhesive fiber lay over configuration is illustrated as the "attached" configuration in FIG. 1B. The adhesion force generated by the adhesion assembly is proportional to the contact area between the microfibers of the adhesive and the surface of the object, and thus the adhesion forces increase as the contact area increases. Accordingly, a gripper with of the presently disclosed synthetic fibrillar adhesive assembly can grasp and manipulate an object after the adhesive fibers have been activated, even if the object is much larger than the gripper itself.

In some embodiments, to detach from an object, the adhesive assembly is actuated backward (as shown in FIG.

1C). The backward movement/actuation releases the shear preload, and thus the microfibers of the adhesives spring back to their initial state. When the adhesives are back in their initial state, the contact area between the adhesives and the object surface becomes negligible again, and thus the fibrillar adhesives are released from the surface.

Figure 3:
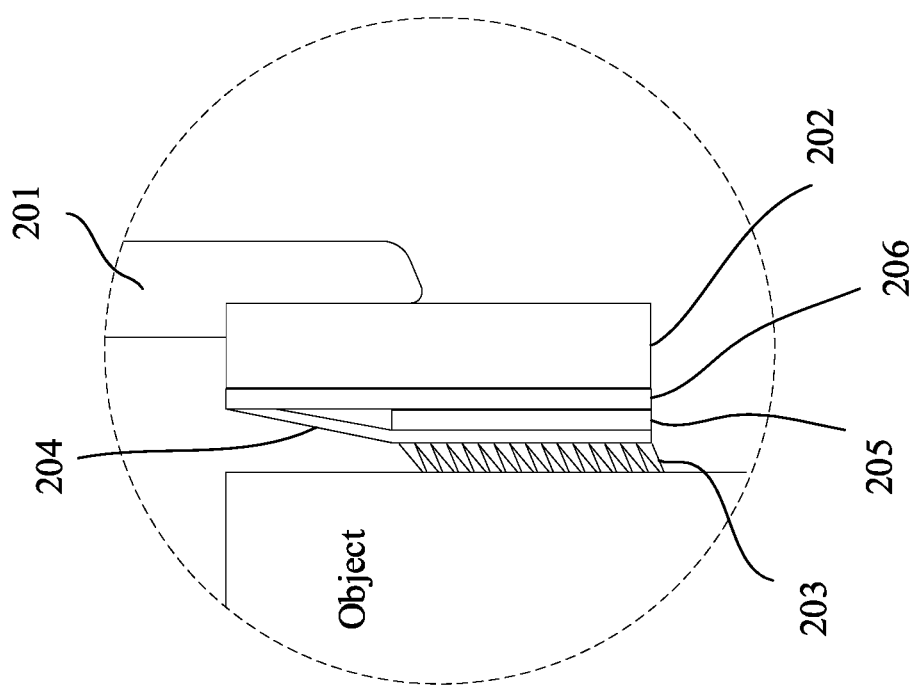
FIG. 3 is an enlarged view of the zone III shown in FIG. 2.
Figure 2:
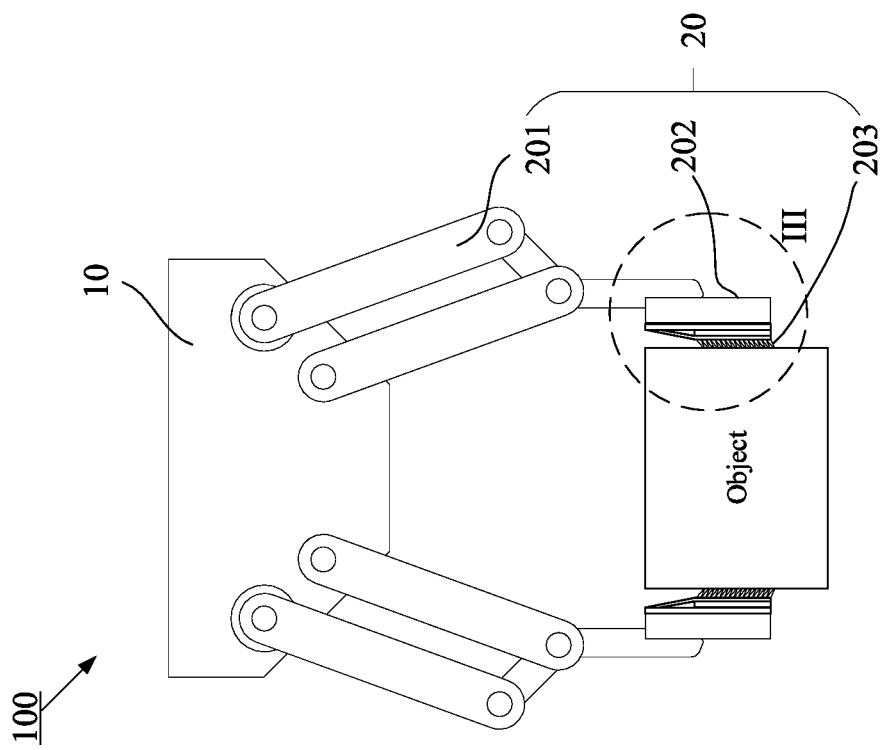
FIG. 2 shows a structural diagram of a gripper with synthetic fibrillar adhesive, according to an embodiment of the present disclosure.

FIG. 2 shows an example structural diagram of a gripper with synthetic fibrillar adhesive according to an embodiment of the present disclosure. FIG. 3 shows an enlarged view of the zone III shown in FIG. 2. The gripper 100 may be utilized to grasp and manipulate an object. As shown in FIG. 2, the gripper 100 may include a shell 10 and at least two finger assemblies 20 (e.g., 2, 3, or 4). The finger assemblies 20 may be utilized to grasp an object as illustrated, for example, on two opposite sides. Each finger assembly 20 may include a connecting rod 201, a pad portion 202, and a layer of synthetic fibrillar adhesive 203. Only the components of the right finger assembly 20 are labeled, but it should be understood that the present disclosure similarly applies to both the left and right finger assemblies 20.

Referring to FIG. 2, in some examples of the present disclosure, the connecting rod 201 may be movably connected to the shell 10, and the connecting rod 201 may move the pad portion 202 towards the object to be grasped under a driving force. For example, one end (e.g., the upper end shown in FIG. 2) of the connecting rod 201 may be rotatably connected to the shell 10. In some embodiments, a driving device (not shown) may be disposed inside the shell 10 and may be configured to rotate the connecting rod 201 such that the pad portion 202 may be moved towards the object. In an alternative embodiment, the connecting rod 201 may be slidably connected to the shell 10. In some aspects of such an alternative embodiment, a driving device may be utilized to push the connecting rods 201 of the two finger assemblies 20 towards each other to make the pad portion 202 move towards the object.

In some examples of the present disclosure, the layer of synthetic fibrillar adhesive 203 may be attached to the pad portion 202. In such examples, microfibers of the layer of synthetic fibrillar adhesive 203 may be inclined away from the shell 10, or in an opposite direction of a main manipulation direction of the gripper 100. For example, if the gripper 100 is utilized to lift an object, the main manipulation direction of the gripper 100 is opposite to the gravitational force acting upon the object (e.g., the main manipulation direction is lifting the object up and the gravitational force is pulling the object down). Thus, when the gripper 100 is utilized to lift an object, the microfibers of the layer of synthetic fibrillar adhesive 203 are inclined in the direction of the gravitational force. In another example, if the gripper 100 is utilized to drag an object on a horizontal plane, the main manipulation direction of the gripper 100 is the dragging direction and microfibers of the layer of synthetic fibrillar adhesive 203 may be inclined in a direction opposite to the dragging direction of the gripper 100.

As illustrated in FIGS. 2 and 3, when the finger assemblies 20 of the gripper 100 are actuated to pinch an object, the layer of synthetic fibrillar adhesive 203 contacts the surface of the object. When the gripper 100 lifts the object or starts manipulation, shear forces are applied on the object, and the synthetic fibrillar adhesive 203 is activated due to significantly increased contact area between the microfibers and the surface of the object. This activation generates a large amount of adhesion that enhances the friction that would otherwise be provided by solely a pinching force. When the pinching force is released, or the object is set free, the synthetic fibrillar adhesive 203 is reset and deactivated (e.g., the contact area is decreased), and thus the adhesion is also released.

In some examples, the inclination direction of microfibers of the layer of synthetic fibrillar adhesive 203 may not be exactly opposite to the manipulation direction of the gripper 100. In such examples, only a portion of the manipulation force provided by the gripper 100 contributes to the activation of the layer of synthetic fibrillar adhesive 203. For instance, the gripper 100 may also move the object in a horizontal direction when the gripper 100 lifts the object. In these instances, the layer of synthetic fibrillar adhesive 203 of the gripper 100 may be activated only by or mainly by the vertical component of the manipulation force provide by the gripper 100. In other words, the layer of synthetic fibrillar adhesive 203 may be activated only by or mainly by the shear forces created by gravity rather than the forces created by the gripper 100 moving the object in a horizontal direction.

In certain embodiments, each finger assembly 20 of the gripper 100 may also include at least one loading component 204. The loading component 204 may include, for example, tendon, rope, cord, film etc. In some examples, the loading component 204 may be substantially inextensible once pulled taut. The loading component 204 may be made of, for example, polyimide, Kevlar, and/or polyester (PET). The loading component 204 may be connected between the layer of synthetic fibrillar adhesive 203 and the pad portion 202 as illustrated in FIG. 3. In some embodiments, the loading component 204 may be capable of transmitting shear force from the pad portion 202 to the layer of synthetic fibrillar adhesive 203 in the main manipulation direction of the gripper 100 (e.g., from the shell 10 toward the layer of synthetic fibrillar adhesive 203).

Figure 4:
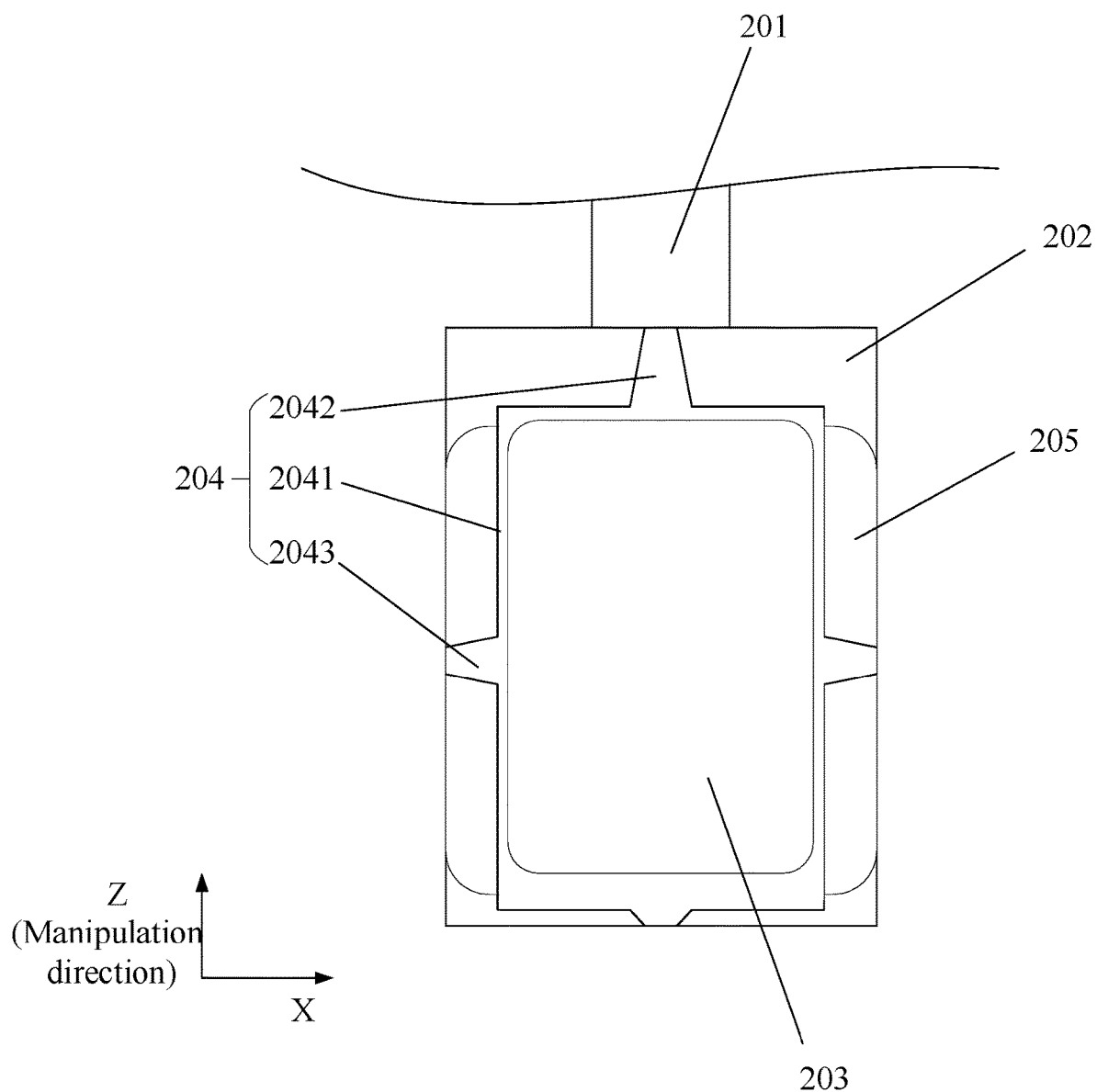
FIG. 4 is a side view of the structure shown in FIG. 3.

In some embodiments, the loading component 204 may also be capable of transmitting shear force from the pad portion 202 to the layer of synthetic fibrillar adhesive 203 in a transverse direction perpendicular to the main manipulation direction of the gripper 100. For example, as shown in FIG. 4, the main manipulation direction of the gripper 100 may be taken as the Z-direction, and the transversal direction perpendicular to the manipulation direction may be taken as the X-direction. The loading component 204 may be capable of transmitting shear force from the pad portion 202 to the layer of synthetic fibrillar adhesive 203 in at least the Z-direction. In embodiments in which the loading component 204 is also capable of transmitting shear force in the X-direction, the lateral load capacity of the gripper 100 may be improved.

In the exemplary structure shown in FIG. 4, the at least one loading component 204 is a loading film. The loading film 204 may include a body portion 2041, a first tendon 2042 and a second tendon 2043. The body portion 2041 may be attached between the layer of synthetic fibrillar adhesive 203 and the pad portion 202. The first tendon 2042 may be connected between the body portion 2041 and a first side (e.g., the upper and/or the lower side shown in FIG. 4) of the pad portion 202 such that the first tendon 2042 together with the body portion 2041 are capable of transmitting shear force from the pad portion 202 to the layer of synthetic fibrillar adhesive 203 in the Z-direction. The second tendon 2043 may be connected between the body portion 2041 and a second side (e.g., the left and/or right side shown in FIG. 4) of the pad portion 202 such that the second tendon 2043 together with the body portion 2041 are capable of transmitting shear force from the pad portion 202 to the layer of synthetic fibrillar adhesive 203 in the X-direction. In other examples, the at least one loading component 204 may include several separate components (e.g., tendons) each of which is connected between a respective side of the pad portion 202 and the layer of synthetic fibrillar adhesive 203. In other examples, the loading component 204 may have other suitable configurations.

Figure 5A:
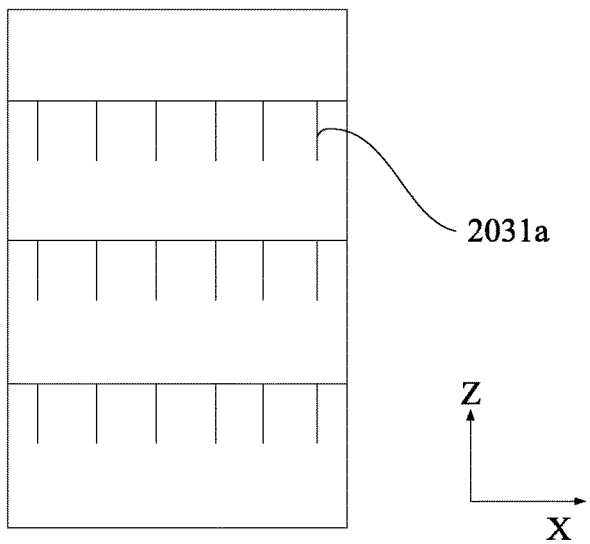
FIGS. 5A, 5B, and 5C illustrate several exemplary configurations of the layer of synthetic fibrillar adhesive, according to embodiments of the present disclosure.
Figure 5B:
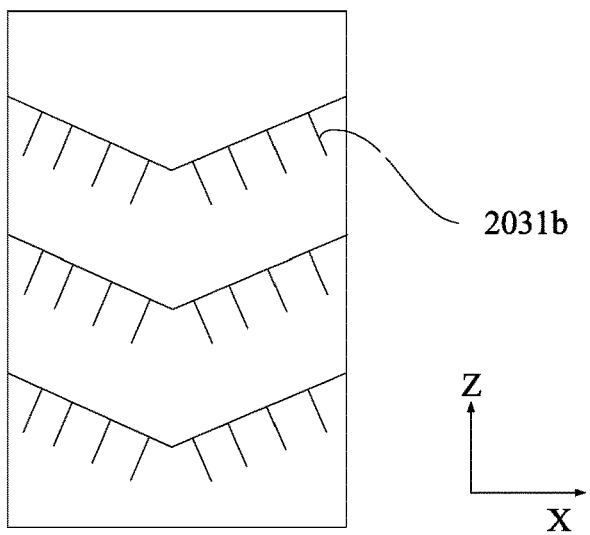
Figure 5C:
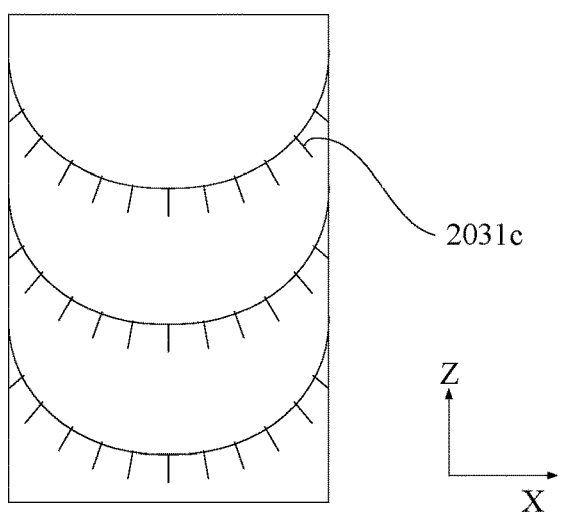

FIGS. 5A, 5B, and 5C illustrate several exemplary configurations of the layer of synthetic fibrillar adhesive 203 shown in FIG. 4. In FIG. 5A, all the microfibers 2031a are inclined toward a same direction, e.g., the negative Z direction. In FIG. 5B, the direction of a portion of the microfibers 2031b is between the negative Z direction and the negative X direction while the direction of the other portion of the microfibers 2031b is between the negative Z direction and the positive X direction. In FIG. 5C, directions of the microfibers 2031c gradually change from one lateral side to another (e.g., from the left side to the right side).

The microfibers 2031a shown in FIG. 5A can only be activated by a positive Z shear force (or a force having a positive Z component). In comparison, the microfibers 2031b and 2031c shown in FIGS. 5B and 5C can be activated not only by a positive Z shear force (or a force having a positive Z component), but also by an X shear force (or a force having an X component). In some examples, when a gripper 100 with a layer of synthetic fibrillar adhesive 203 having microfibers 2031b or 2031c grasps an object and moves it along the X direction instead of the Z direction, the layer of synthetic fibrillar adhesive 203 may also be activated such that adhesion between the gripper 100 and the object may be improved. In other examples, the microfibers 2031a, 2031b, and 2031c may have other suitable arrangements other than those illustrated.

In some embodiments, each finger assembly 20 of the gripper 100 may also include a compliant layer 205. The compliant layer 205 may be laid between the loading component 204 and the pad portion 202. The compliant layer 205 may be an elastic element such as foam, rubber, flexure springs, or other suitable elastic elements. The compliant layer 205 may improve conformability of the gripper 100 for different object shapes. In embodiments in which each finger assembly 20 includes a compliant layer 205, the layer of synthetic fibrillar adhesive 203 may get full contact with the surface of the object to be grasped when the gripper 100 pinches the object.

In one embodiment, the layer of synthetic fibrillar adhesive 203, the loading component 204 and the compliant layer 205 may be directly connected to the pad portion 202. In another embodiment, as shown in FIG. 3, an adapting structure 206 may be mounted on the pad portion 202 for facilitating the installation of the layer of synthetic fibrillar adhesive 203, the loading component 204 and the compliant layer 205. The adapting structure 206 may be any suitable structure and material capable of being mounted on the pad portion 202 for such facilitation as described.

Figure 6:
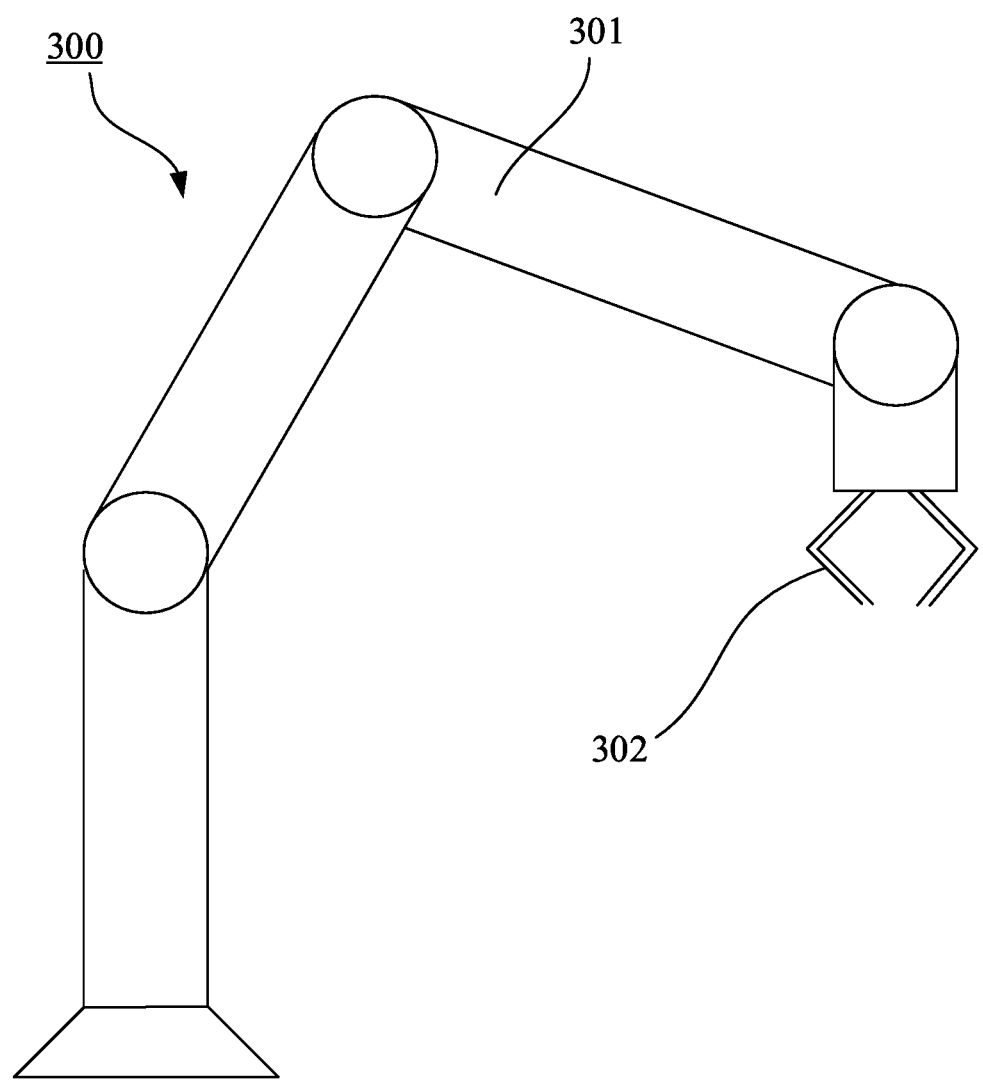
FIG. 6 shows a structural diagram of a robot having a gripper, according to an embodiment of the present disclosure.

Referring to FIG. 6, the present disclosure also provides for a robot 300. The robot 300 may include several links 301 and a gripper 302. The robot 300 may be utilized to grasp or catch an object. In particular, the gripper 302 may be the presently disclosed gripper 100. In other embodiments, the robot 300 may include more components or less components than illustrated in FIG. 6, such as additional links 301 and end effectors. For example, some components (e.g., two or more links) may be combined and different or additional types of components may be employed than those depicted. In another example, the robot may further include an I/O device, a network accessing device, a communication bus, a processor, a memory, actuators, and sensors. These additional components may implement a control system, such as a control system generating one or more of the control signals discussed above. For example, the robot 300 may include a processor and a memory storing instructions which, when executed by the processor, cause the processor to implement the control system. The memory may also store instructions which, when executed by the processor, cause the processor to activate or deactivate the gripper 302 so as to catch or release the object to be grasped.

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

What is claimed is:

1. A gripper configured to grasp an object, comprising:
   a shell; and
   at least two finger assemblies configured to grasp the object on two opposite sides of the object respectively, each of the at least two finger assemblies comprising:
      a connecting rod movably connected to the shell;
      a pad portion connected to the connecting rod, wherein the connecting rod is configured to move the pad portion towards the object under a driving force;
      a layer of synthetic fibrillar adhesive attached to the pad portion, wherein microfibers of the layer of synthetic fibrillar adhesive are inclined away from the shell; and
      at least one loading component connected between the layer of synthetic fibrillar adhesive and the pad portion, the at least one loading component configured to transmit shear force from the pad portion to the layer of synthetic fibrillar adhesive in a first direction from the shell toward the layer of synthetic fibrillar adhesive and to transmit shear force from the pad portion to the layer of synthetic fibrillar adhesive in a second direction perpendicular to the first direction, the at least one loading component comprising:
         a body portion attached between the layer of synthetic fibrillar adhesive and the pad portion;
         a first tendon connected between the body portion and a first side of the pad portion, the first tendon configured to transmit shear force from the pad portion to the layer of synthetic fibrillar adhesive in the first direction; and
         a second tendon connected between the body portion and a second side of the pad portion, the second tendon configured to transmit shear force from the pad portion to the layer of synthetic fibrillar adhesive in the second direction.

2. The gripper of claim 1, wherein
   the gripper is further configured to lift the object;
   wherein when the gripper lifts the object, the layer of synthetic fibrillar adhesive is activated by gravity such that a contact area and an adhesion force increase between microfibers of the layer of synthetic fibrillar adhesive and the object.

3. The gripper of claim 1, wherein each of the at least two finger assemblies further comprises a compliant layer attached between the loading component and the pad portion.

4. The gripper of claim 1, wherein
an inclination direction of a portion of the microfibers of the layer of synthetic fibrillar adhesive is different from that of another portion of the microfibers.

5. A gripper configured to grasp an object, comprising:
a shell; and
at least two finger assemblies, each comprising:
   a connecting rod movably connected to the shell;
   a pad portion connected to the connecting rod, wherein the connecting rod is configured to drive the pad portion to grasp the object under a driving force;
   a layer of synthetic fibrillar adhesive attached to the pad portion; and
   at least one loading component connected between the layer of synthetic fibrillar adhesive and the pad portion, the at least one loading component configured to transmit shear force from the pad portion to the layer of synthetic fibrillar adhesive in a first direction from the shell toward the layer of synthetic fibrillar adhesive and to transmit shear force from the pad portion to the layer of synthetic fibrillar adhesive in a second direction perpendicular to the first direction, the at least one loading component comprising:
      a body portion attached between the layer of synthetic fibrillar adhesive and the pad portion;
      a first tendon connected between the body portion and a first side of the pad portion, the first tendon configured to transmit shear force from the pad portion to the layer of synthetic fibrillar adhesive in the first direction; and
      a second tendon connected between the body portion and a second side of the pad portion, the second tendon configured to transmit shear force from the pad portion to the layer of synthetic fibrillar adhesive in the second direction,
wherein when the gripper lifts the object, the layer of synthetic fibrillar adhesive is activated by gravity such that a contact area and an adhesion force increase between microfibers of the layer of synthetic fibrillar adhesive and the object.

6. The gripper of claim 5, wherein each of the at least two finger assemblies further comprises a compliant layer attached between the layer of synthetic fibrillar adhesive and the pad portion.

7. The gripper of claim 5, wherein
an inclination direction of a portion of the microfibers of the layer of synthetic fibrillar adhesive is different from that of another portion of the microfibers.

8. A robot having a gripper and configured to grasp an object, the gripper comprising:
a shell; and
at least two finger assemblies configured to grasp the object on two opposite sides of the object respectively, each of the two finger assemblies comprising:
   a connecting rod movably connected to the shell;
   a pad portion connected to the connecting rod, wherein the connecting rod is configured to move the pad portion towards the object under a driving force;
   a layer of synthetic fibrillar adhesive attached to the pad portion, wherein microfibers of the layer of synthetic fibrillar adhesive are inclined away from the shell; and
   at least one loading component connected between the layer of synthetic fibrillar adhesive and the pad portion, the at least one loading component configured to transmit shear force from the pad portion to the layer of synthetic fibrillar adhesive in a first direction from the shell toward the layer of synthetic fibrillar adhesive and to transmit shear force from the pad portion to the layer of synthetic fibrillar adhesive in a second direction perpendicular to the first direction, the at least one loading component comprising:
      a body portion attached between the layer of synthetic fibrillar adhesive and the pad portion,
      a first tendon connected between the body portion and a first side of the pad portion, the first tendon configured to transmit shear force from the pad portion to the layer of synthetic fibrillar adhesive in the first direction, and
      a second tendon connected between the body portion and a second side of the pad portion, the second tendon configured to transmit shear force from the pad portion to the layer of synthetic fibrillar adhesive in the second direction.

9. The robot of claim 8, wherein
the gripper is further configured to lift the object;
wherein when the gripper lifts the object, the layer of synthetic fibrillar adhesive is activated by gravity such that a contact area and an adhesion force increase between microfibers of the layer of synthetic fibrillar adhesive and the object.

10. The robot of claim 8, wherein each of the at least two finger assemblies further comprises a compliant layer attached between the loading component and the pad portion.

11. The robot of claim 8, wherein
an inclination direction of a portion of the microfibers of the layer of synthetic fibrillar adhesive is different from that of another portion of the microfibers.

* * * * *